United States Patent
Lee et al.

(10) Patent No.: US 8,073,334 B2
(45) Date of Patent: Dec. 6, 2011

(54) OPTICAL MODULATION METHOD AND SYSTEM IN WAVELENGTH LOCKED FP-LD BY INJECTING BROADBAND LIGHT SOURCE USING MUTUALLY INJECTED FP-LD

(75) Inventors: Chang-Hee Lee, Daejon (KR); Ki-Man Choi, Daegu (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 917 days.

(21) Appl. No.: 11/665,902

(22) PCT Filed: Nov. 8, 2005

(86) PCT No.: PCT/KR2005/003767
§ 371 (c)(1),
(2), (4) Date: Nov. 8, 2007

(87) PCT Pub. No.: WO2006/052075
PCT Pub. Date: May 18, 2006

(65) Prior Publication Data
US 2009/0196612 A1    Aug. 6, 2009

(30) Foreign Application Priority Data
Nov. 9, 2004   (KR) .................... 10-2004-0091078

(51) Int. Cl.
*H04B 10/00* (2006.01)
*H04B 10/04* (2006.01)
*H04B 10/12* (2006.01)
*H04J 14/02* (2006.01)

(52) U.S. Cl. .............. 398/91; 398/82; 398/92; 398/147; 398/159; 398/192; 398/193; 398/194

(58) Field of Classification Search ............... 398/81, 398/82, 85, 91, 92, 147, 152, 158, 159, 168, 398/169, 170, 182, 192–194
See application file for complete search history.

(56) References Cited

U.S. PATENT DOCUMENTS
5,251,054 A    10/1993    Lynn
(Continued)

FOREIGN PATENT DOCUMENTS
CN        1394005 A    1/2003
(Continued)

OTHER PUBLICATIONS

Choi, K.M. "Broadband Light Source by Mutually Injected FP-LDs" OECC/COIN 2004, Jan. 1, 2004, pp. 882-884, XP009126452.
(Continued)

*Primary Examiner* — Leslie Pascal
(74) *Attorney, Agent, or Firm* — Blakely, Sokoloff, Taylor & Zafman LLP.

(57) ABSTRACT

The present invention relates to an optical modulation method and optical modulation system of a wavelength locked Fabry Perot-Laser Diode (FP-LD) by injecting a broadband light source (BLS) using mutual injection of FP-LDs. More specifically, the present invention relates to a novel modulation technology which embodies a wavelength locked FP-LD capable of being used as an economic light source in an optical network based on a wavelength-division multiplexing passive optical network (WDM-PON). According to the present invention, a light modulation system is suggested comprising: BLS being constructed by mutual injection between two FP-LDs and an optical fiber being used for light transmission; first AWG for filtering light from a plurality of oscillation modes of the BLS into n group; n FP-LDs outputting wavelength locked light which is divided through the first AWG; an encoder being provided at a transmitting end of a subscriber to which the output from the first AWG is transmitted; a circulator outputting light which is inputted through the first AWG; second AWG de-multiplexing WDM signals from the first AWG into n group; and a decoder being provided at a receiving end to which the output from the second AWG is transmitted. Therefore, the present invention makes it possible to provide a more economic light source for WDM-PON subscribers by embodying a wavelength locked FP-LD by injecting a low-cost BLS.

22 Claims, 6 Drawing Sheets

U.S. PATENT DOCUMENTS

| | | | |
|---|---|---|---|
| 5,600,471 | A | 2/1997 | Hirohashi et al. |
| 6,469,649 | B1 * | 10/2002 | Helkey et al. ............. 341/155 |
| 6,470,036 | B1 * | 10/2002 | Bailey et al. .............. 372/20 |
| 6,674,969 | B1 * | 1/2004 | Ogusu .................... 398/79 |
| 7,092,595 | B2 * | 8/2006 | Sorin et al. ............... 385/24 |
| 7,415,205 | B2 * | 8/2008 | Shin et al. ................ 398/5 |
| 2001/0004290 | A1 | 6/2001 | Lee et al. |
| 2003/0002121 | A1 | 1/2003 | Miyamoto et al. |
| 2003/0223761 | A1 * | 12/2003 | Brown et al. ............. 398/183 |
| 2004/0184805 | A1 | 9/2004 | Shin et al. |
| 2004/0208208 | A1 | 10/2004 | Shin et al. |
| 2006/0262324 | A1 * | 11/2006 | Hays et al. ............... 356/519 |

FOREIGN PATENT DOCUMENTS

| | | |
|---|---|---|
| EP | 1 271 808 A2 | 6/2002 |
| JP | 61-114624 | 6/1986 |
| JP | 06-252860 | 9/1994 |
| KR | 10-0325687 | 2/2002 |

OTHER PUBLICATIONS

PCT International Search Report for PCT/KR2005/003767, mailed Feb. 17, 2006, 2 pages.

PCT Written Opinion for PCT/KR2005/003767, mailed Feb. 17, 2006, 3 pages.

Shin, et al., "155 Mbit/s Transmission Using ASE-Injected Fabry-Perot Laser Diode in WDM-PON over 70^0C Temperature Rage," Electronics Letters, Sep. 4, 2003, vol. 39, No. 18, pp. 1331-1332.

Oh, Tae-Won et al., "Broadband Light Source for Wavelength-Division Multiple Access Passive Optical Network," Dept. of Elec. Eng., Korea Adv. Institute of Science and Tech., and Novera Optics Korea, Inc. Nov. 29, 2007, OECC 2003.

Kazuko Kikuchi, "Effect of 1/f-Type FM Noise on Semiconductor-Laser Linewidth Residual in High-Power Limit", IEEE Journal of Quantum Electronics, Apr. 1989, pp. 684-688.

PCT International Preliminary Report on Patentability for PCT Counterpart Application No. PCT/KR2005/003767, May 15, 2007, 4 pages.

Office Action for Counterpart EP Application No: 05820436.3, Mar. 28, 2011, 7 pages.

Office Action for counterpart Chinese Patent Application No. 200580038051.2, 4 pgs (Jul. 14, 2011).

* cited by examiner

OPTICAL MODULATION METHOD AND SYSTEM IN WAVELENGTH LOCKED FP-LD BY INJECTING BROADBAND LIGHT SOURCE USING MUTUALLY INJECTED FP-LD

CROSS REFERENCE TO RELATED APPLICATION

This patent application is a National Phase application under 35 U.S.C. §371 of International Application No. PCT/KR2005/003767, filed on Nov. 8, 2005, entitled OPTICAL MODULATION METHOD AND SYSTEM IN WAVELENGTH LOCKED FP-LD BY INJECTING BROADBAND LIGHT SOURCE USING MUTUALLY INJECTED FP-LD which claims priority to South Korean Patent Application No. 10-2004-0091078, filed Nov. 9, 2004.

TECHNICAL FIELD

The present invention relates to an optical modulation method and optical transmission system for a wavelength locked Fabry Perot-Laser Diode (FP-LD) by injecting a broadband light source (BLS) using mutual injection of FP-LDs. More specifically, the present invention relates to a novel modulation technology which embodies a wavelength locked FP-LD capable of being used as an economic light source in an optical network based on a wavelength-division multiplexing passive optical network (WDM-PON).

BACKGROUND ART

Capacity extension is required in an existing optical network in order to provide various multimedia services such as a gradually increased data traffic, a high definition television (HDTV), electronic commerce, and video on demand (VOD), etc. For this purpose, a study on optical fiber based PON technologies has attracted considerable attention. A wavelength-division multiplexing (WDM) technology among current PON technologies is perceived to be an ultimate alternative. In the WDM technology, one wavelength per subscriber must be assigned to provide virtual point to point connectivity. Thus, it is essential in the WDM-PON technology to embody a low-cost light source for subscribers.

A wavelength locked FP-LD is recently suggested and recognized as an economic light source for WDM-PON (See Korean Patent No. 325687 registered on Feb. 28, 2002 entitled "A low-cost WDM source with an incoherent light injected Fabry-Perot semiconductor laser diode" by the inventors Chang-Hee, Lee and Hyun-Deok, Kim). Here, the wavelength locked FP-LD is a light source which is obtained by injecting a filtered incoherent light source or a BLS into an FP-LD oscillating in a multi-mode and locking the oscillating wavelength of the FP-LD to the wavelength of the injected BLS so as for the FP-LD to oscillate in a single mode.

Here, a BLS to be injected for locking wavelength may be a light emission diode (LED), erbium-doped fiber amplifiers (EDFA) emitting amplified spontaneous emission (ASE), a super luminescent diode (SLD), etc. (See T. W. Oh, et al., "Broadband Light Source for Wavelength-Division Multiple Access Passive Optical" OECC, 2003). However, the main disadvantage for LED, EDFA, and SLD, etc. is a large size or high cost. Unlike them, a BLS using mutual injection of FP-LDs is compact and possible to embody at a low cost and thus is more advantageous in implementing an economic WDM-PON (See K. M. Choi, et al., "Broadband Light Source by Mutually Injected FP-LDs" OECC, 2004).

DISCLOSURE OF INVENTION

One object of the present invention is to solve the prior art problems by suggesting a novel FP-LD modulation method and optical transmission system capable of enhancing a transmission quality of a wavelength locked FP-LD by injecting a BLS using mutual injection of FP-LDs.

To achieve the above object, the present invention provide a optical network comprising: BLS being constructed by mutual injection between two FP-LDs and an optical fiber being used for optical transmission; first AWG for filtering light from a plurality of oscillation modes of the BLS into a group of n numbers; n FP-LDs outputting wavelength locked light through the first AWG; an encoder being provided at a transmitting end of a subscriber which includes F-P LD; a circulator outputting light which is inputted through the first AWG and the optical fiber; second AWG de-multiplexing WDM signals from the first AWG into a group of n numbers; and a decoder being provided at a receiving end which includes receiver (RX) receiving the output from the second AWG.

ADVANTAGEOUS EFFECT

In accordance with the present invention, characteristics of wavelength locked FP-LD may vary depending on the temperature change of FP-LD3 in FIG. 1 when a BLS which is filtered based on a specific wavelength is injected into FP-LD3 which is a laser for subscriber.

An error-free transmission is possible as shown in FIG. 10, although a power penalty of approximately 2.5 dB occurs when measuring BER for analyzing transmitted signals at best and worst cases in performance of wavelength locked FP-LD3 obtained from an experimental structural view in FIG. 6.

That is, any wavelength locked FP-LD embodied by modulating a signal with a modulation format having an electrical spectrum in an area capable of avoiding noise of an injected BLS using mutual injection of FP-LDs is adapted for being used as a light source for subscriber regardless of a change of ambient temperature.

BEST MODE FOR CARRYING OUT THE INVENTION

Hereinafter, structures and functions of preferred embodiments in accordance with the present invention are described in more detail with reference to the appended drawings.

Figure 1:
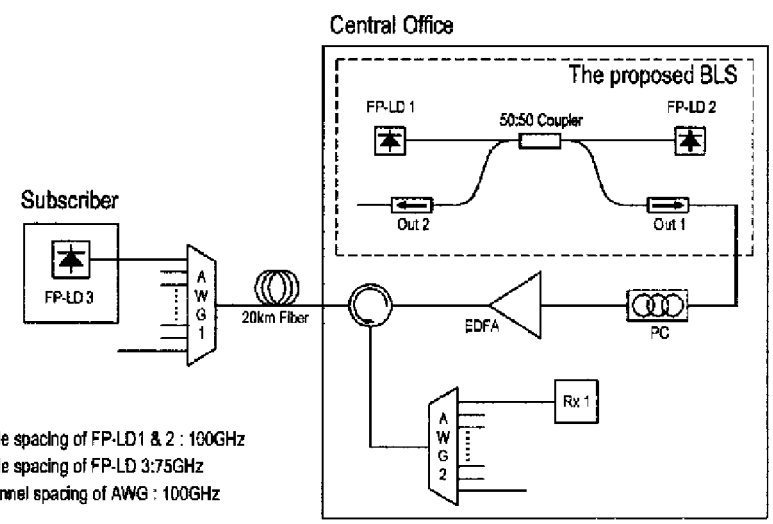
FIG. 1 illustrates a structural view of wavelength locked FP-LD by injecting BLS using mutual injection of FP-LDs in accordance with an embodiment of the present invention.
Figure 2:
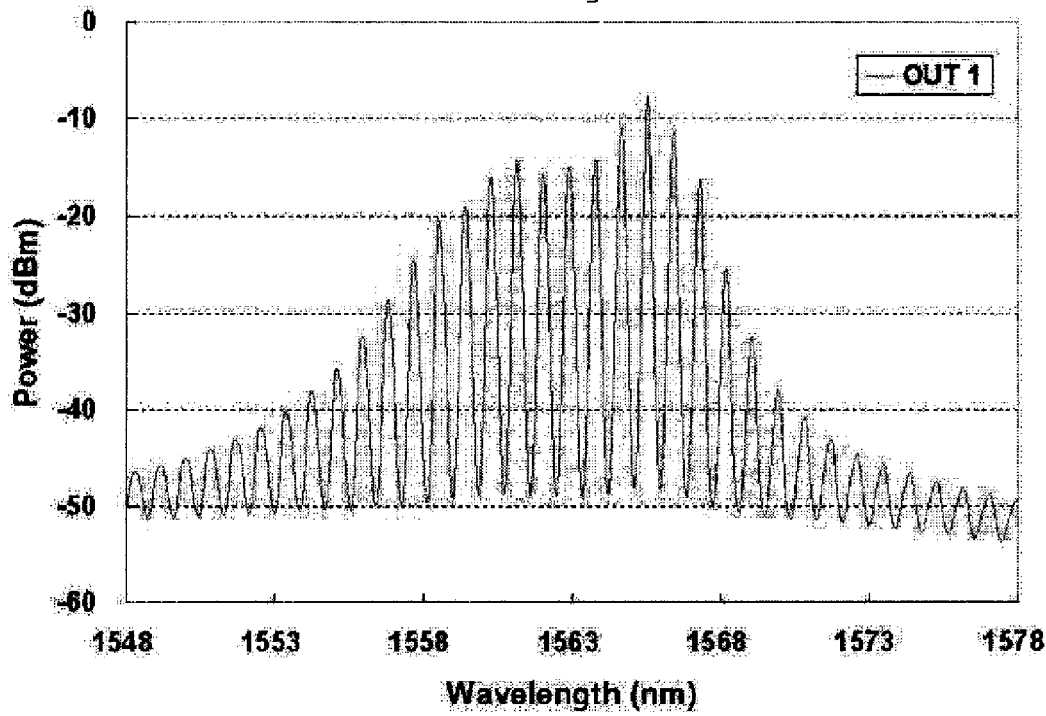
FIG. 2 illustrates a light spectrum of BLS using mutual injection of FP-LDs.
Figure 3:
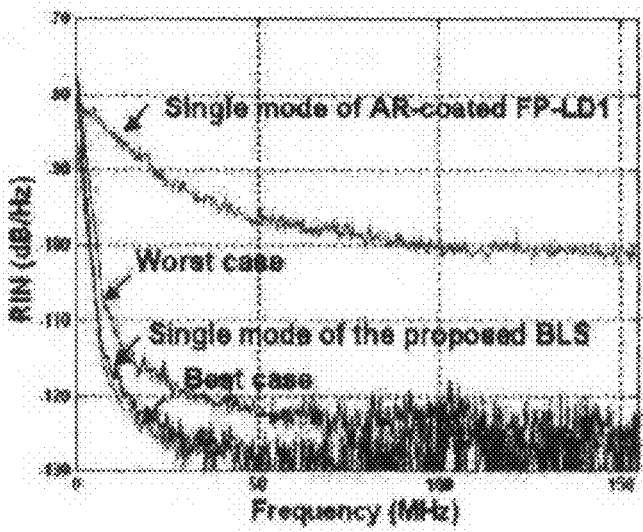
FIG. 3 illustrates noise characteristics of BLS using mutual injection of FP-LDs and wavelength locked FP-LD.

In the present invention, BLS having a structure illustrated as a dotted line in FIG. 1 is injected in order to embody a wavelength locked FP-LD. The injected BLS is a light source embodied using a mutual injection principle between two FP-LDs (FP-LD1, FP-LD2) with an Anti-Reflection (AR) coating at the front facet. Linewidth of one of a single FP-LD before mutual injection is widened to approximately 0.2 nm after mutual injection. Additionally, the BLS in FIG. 1 has a characteristic in that a mode partition noise in one mode of FP-LD is reduced. A light spectrum of BLS using mutual injection of FP-LDs is illustrated in FIG. 2 and noise characteristics are illustrated in FIG. 3. Form FIGS. 2 and 3, it is confirmed that linewidth is widened and noise is reduced.

A structure illustrated in FIG. 1 is used in order to embody wavelength locked FP-LD by injecting the BLS which is embodied by mutual injection of FP-LD1,2. Output power of the BLS is filtered to a desired wavelength and filtered output power is injected into FP-LD3 at subscriber side which oscillates in a multimode. To accommodate more subscribers, a F-P LD can be attached to an output port of AWG 1. Here, one optical fiber amplifier (EDFA) is used in order to complement power of the BLS, while a polarization controller (PC) is used for adjusting a polarization of BLS with a polarization of FP-LD3 at subscriber side. In this regard, when an ambient temperature is changed, a lasing wavelength of FP-LD3 is changed so that performance of wavelength locked FP-LD is dependent on temperature. Therefore, one goal of the present invention is to embody a light source for subscribers independent of a temperature change, which is one of important factors to be used as a wavelength-division multiplexing (WDM) source.

Figure 4:
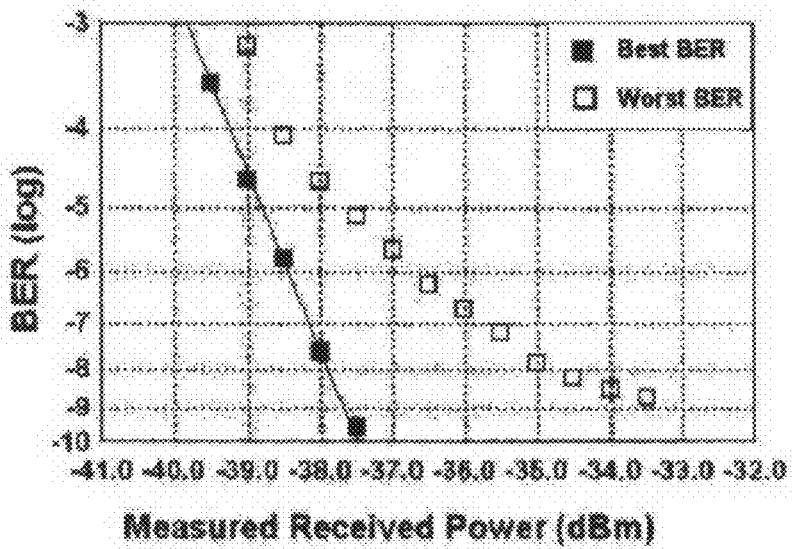
FIG. 4 illustrates bit error rate (BER) characteristics of wavelength locked FP-LD embodied by the structure shown in FIG. 1.

FIG. 4 illustrates the measured bit error rate (BER) characteristics at best and worst cases depending on temperature, in a case that wavelength locked FP-LD3 by injecting one mode of the BLS by mutual injection of FP-LD1,2 is modulated by using NRZ data of 100 Mb/s. FIG. 4 shows that if a transmission characteristic of an embodied light source falls upon a worst case, error-free transmission is not available, unlike a best case. This result is caused from noise components existing at a low frequency region in a relative intensity noise (RIN) spectrum of one mode of the BLS by mutual injection of FP-LD1,2 as shown in FIG. 3. Therefore, the present invention is intended to suggest a method of using wavelength locked FP-LD using BLS by mutual injection of FP-LD1,2 as a light source independent of temperature change at subscriber side. For this purpose, performance of transmitted light can be improved through a method for minimizing the noise influence existing at a low frequency region of one mode of the BLS which is filtered and injected.

One mode filtered at the BLS which is embodied by using mutual injection of FP-LD1,2 has a high noise component at a low frequency region as illustrated in FIG. 3. Thus, a wavelength locked light source by injecting the BLS having a noise characteristic described above has also the same noise component, as shown in FIG. 3. If performance of wavelength locked light source is best, noise characteristics shows the same pattern as those of the injected BLS and the noise of the injected BLS is reduced. On the contrary, if performance of wavelength locked light source is worst, FIG. 3 shows that noise suppression effect does not appear and the noise is rather increased. A principle is applied to the present invention where a noise characteristic is enhanced even not including a noise component at a low frequency region when performing a signal modulation for enhancing transmission performance of wavelength locked FP-LD by injecting the BLS embodied through mutual injection of FP-LD1,2.

Figure 5:
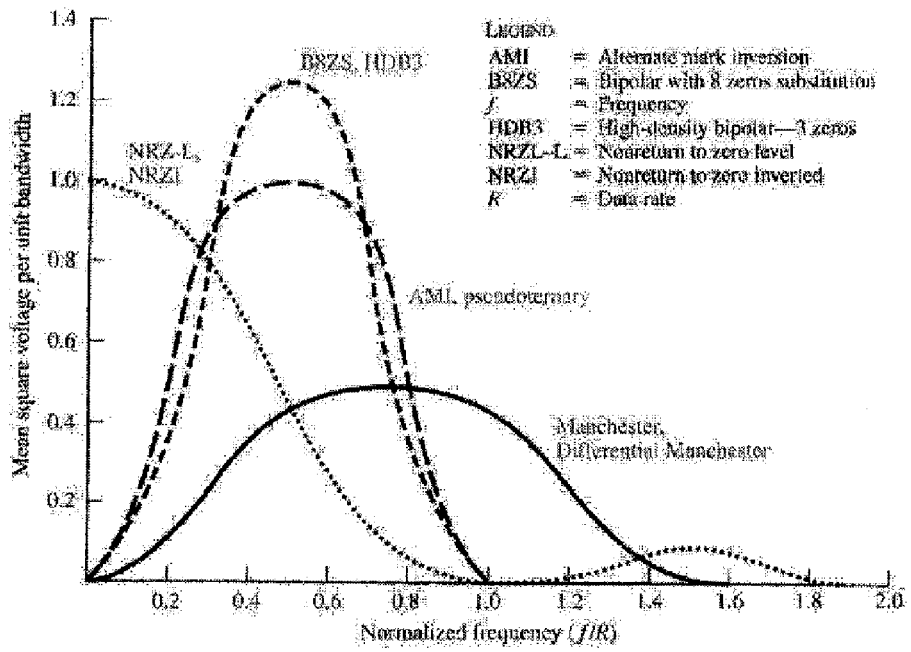
FIG. 5 illustrates an electrical spectrum of modulation formats.

A transmitted signal may have both a low frequency noise component of the BLS and a modulated signal spectrum, if the transmitted signal is modulated in a manner that does not have an electrical spectrum component at a low frequency region among the modulation methods illustrated in FIG. 5. Receiver side receives the transmitted signal having both a low frequency noise component of the BLS and a modulated signal spectrum, and passes only the modulated signal spectrum component thereby removes the low frequency noise component of the BLS. In this case, if most part of the modulated signal spectrum component is passed, it is possible to receive the transmitted signal without any distortion thereof. By removing the noise in a low frequency component using the method described above, degradation of transmission quality due to the low frequency noise component is improved.

The present invention describes the structure and the operative principle thereof based on the result of 50 Mb/s modulation with the Manchester format among the various modulation formats suggested in FIG. 5. The structure of the present invention is illustrated in FIG. 6 which shows an experimental structural view for a wavelength locked FP-LD light source.

Figure 6:
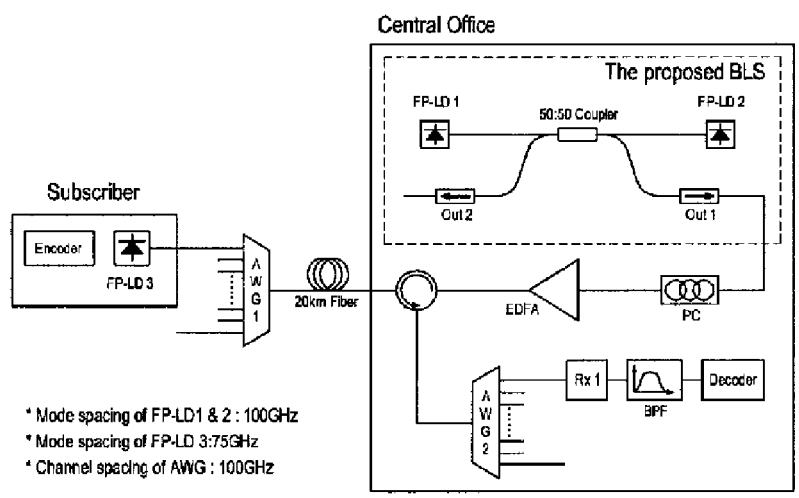
FIG. 6 illustrates a structural view of modulation method of wavelength locked FP-LD by injecting BLS using mutual injection of FP-LDs in accordance with an embodiment of the present invention.

In FIG. 6, the BLS used in the present invention is a BLS which utilizes a mutual injection principle between FP-LD1,2 where each of FP-LD1,2 has an AR coating at the front facet. The light power of the BLS after passing PC (Polarization Controller) is amplified through EDFA and then passes optical fiber (20 Km) for transmission and enters into first AWG which filters and divides the transmitted light into a group of n numbers where n is a output port number of the first AWG or a channel number for WDM signals. One divided BLS output is injected into FP-LD3 which outputs a wavelength locked light source.

Figure 8:
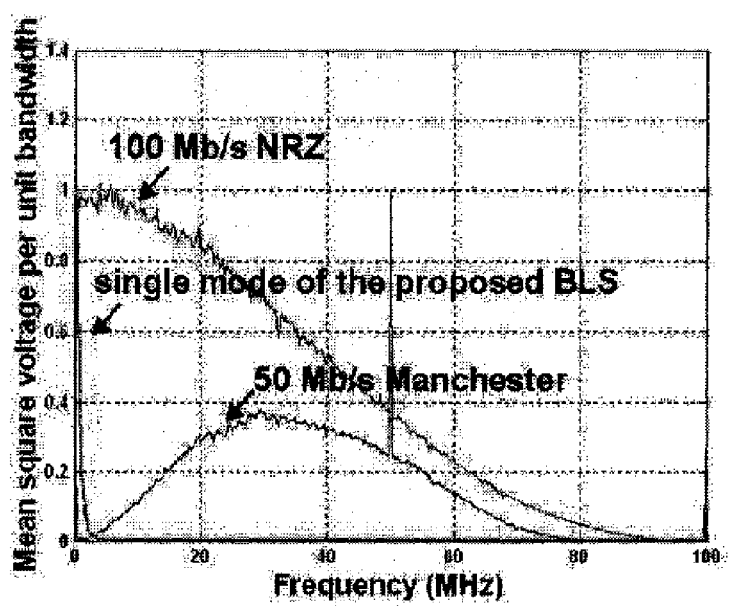
FIG. 8 illustrates spectra of filtered BLS, and Manchester data being used in an experiment and NRZ as modulation formats.

In the present invention, the temperatures of n FP-LDs are controlled by a heater and a TEC, and FP-LD3 at subscriber side transmits data after modulating the data using a Manchester Code. The modulation format used in the experiment is a Manchester format which is encoded from NRZ signal, and the respectively measured electrical spectrums are illustrated in FIG. 8.

Preferably, the modulation formats which may be applied to the present invention are bi-polar, RZ (RZ-AMI), differential Manchester, B8ZS, HDB3, and pseudoternary, etc. If data is modulated by a format like Manchester code which does not have an electrical component in a low frequency region as shown in FIG. 8, the low frequency noise component of an injected BLS does not influence a transmitted data.

The modulated data described above passes the first AWG and the circulator (which is placed between optical fiber and EDFA) and is transmitted to a receiving end after passing through the second AWG which exists at central office. The transmitted data undergoes photoelectric transformation at a photo diode (Rx 1) and noise existing at a low frequency area of the data is filtered through band pass filter (BPF). The filtered data is decoded from the Manchester format to its original NRZ data by decoder.

Figure 7:
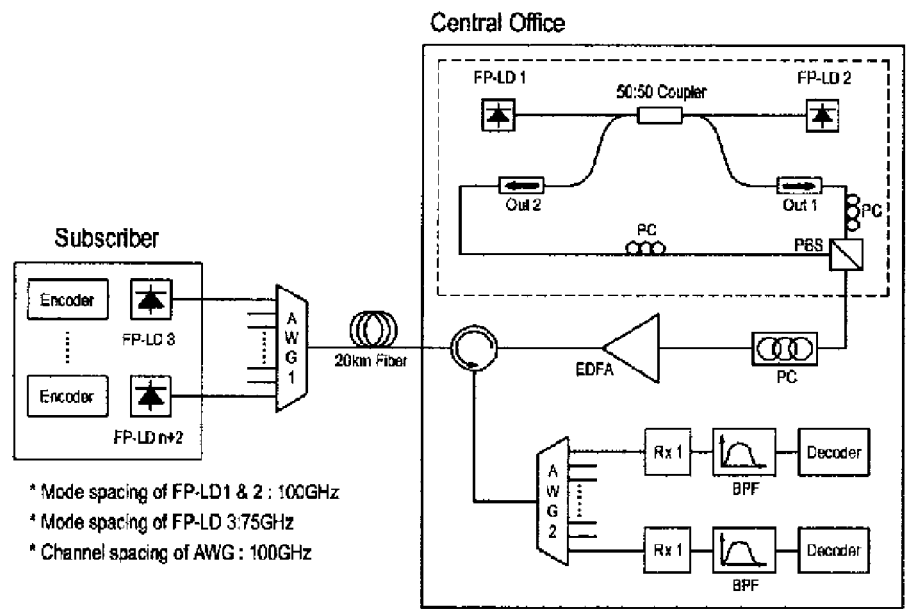
FIG. 7 illustrates a structural view of WDM-PON based on FIG. 6.
Figure 9:
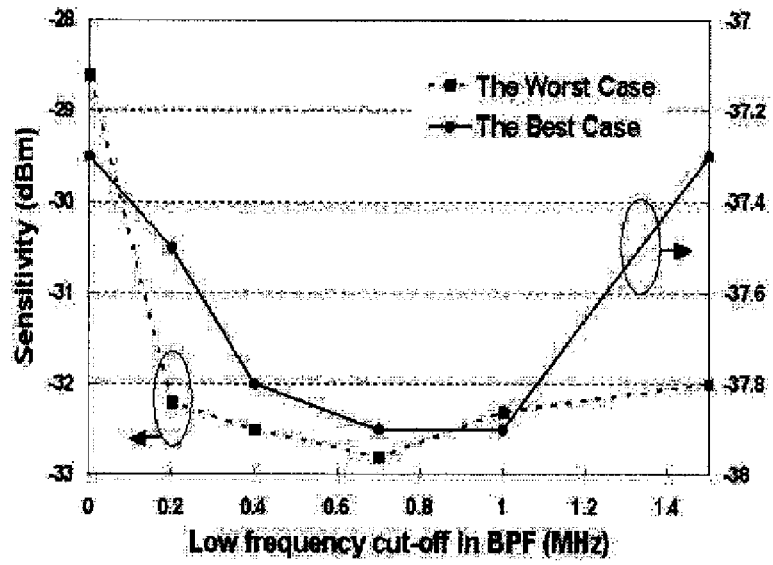
FIG. 9 illustrates receiving sensitivity of wavelength locked FP-LD depending on the change of low frequency cut-off in BPF.
Figure 10:
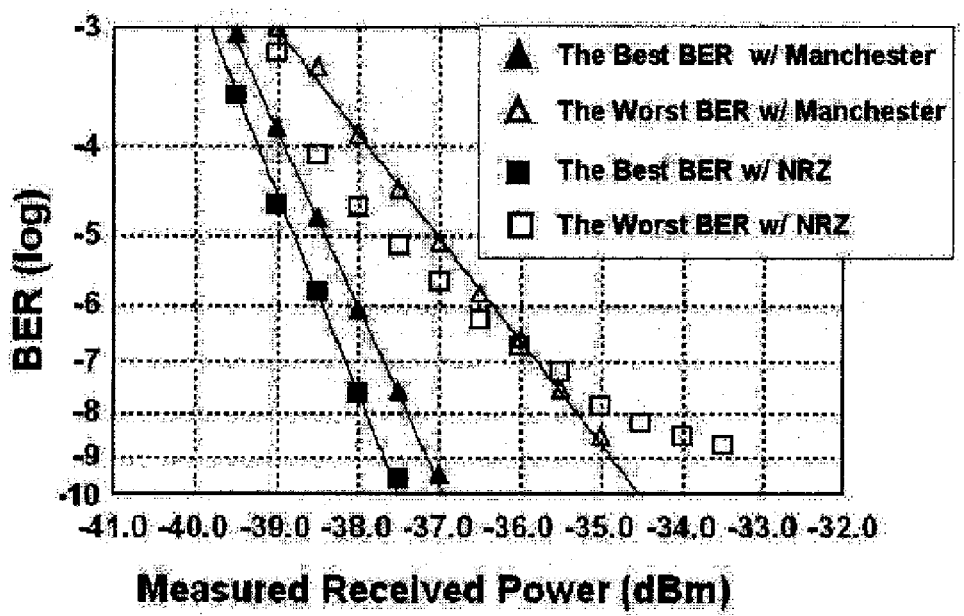
FIG. 10 illustrates best and worst BERs when NRZ and Manchester data are transmitted.
Figure 11:
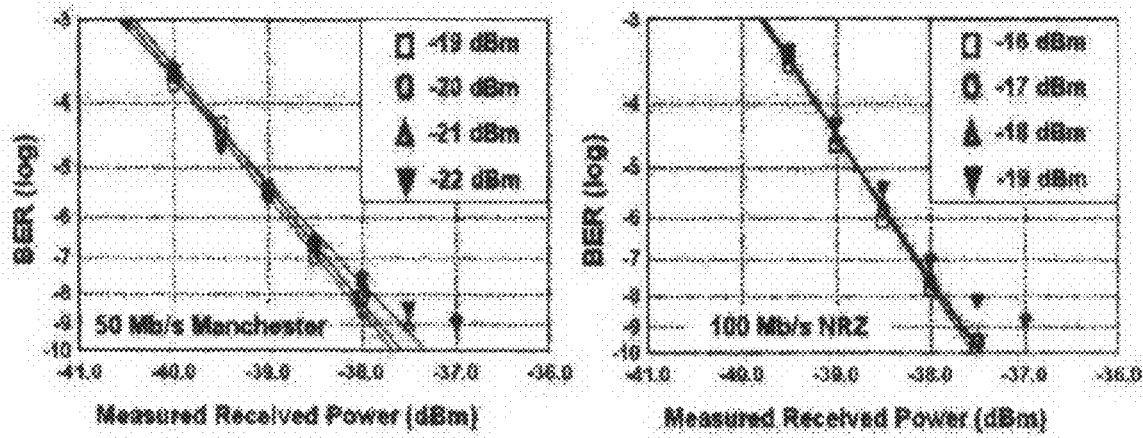
FIG. 11 illustrates best BERs depending on the power of injected BLS when transmitting NRZ and Manchester data.

In the present invention, performance of received signals is affected depending on low frequency cut-off in BPF, and FIG. 9 illustrates sensitivity for obtaining $10^{-9}$ BER. An optimal low frequency cut-off is determined from FIG. 9, and BER characteristic obtained when the determined optimal low frequency cut-off is applied to the BPF at receiving end of the central office is improved as shown in FIG. 10. That is, it can be understood that an error-free transmission is possible even in a case that a BER characteristic of 50 Mb/s Manchester of a wavelength locked FP-LD is worst. Further, BLS power of −21 dBm or more needs to be injected in a best case to obtain an error-free transmission. Form FIG. 11, this means that the required injection power is less by 3 dB, compared with the injection power required when transmitting 100 Mb/s NRZ data while using a receiver having the same bandwidth as that of a receiver illustrated in FIG. 7 without the BPF.

It is possible to embody a WDM-PON system when applying the above principle to a plurality of FP-LDs existing at subscriber side. In this case, the BLS must have an unpolarized output by using two PCs and one polarization beam splitter (PBS). Referring to a structural view in FIG. 7, polarization multiplexed BLS passing optical fiber (20 Km) for transmission is divided through first AWG which filters various oscillation modes of the BLS into a group of n numbers where n is a output port number of the first AWG or a channel number for WDM signals, and then is injected into n FP-LDs each of which outputs wavelength locked light.

The n FP-LDs existing at subscriber side modulates data into the Manchester code format. The modulated data described above passes first AWG, the transmission fiber, circulator (which is outputting light which is inputted through first AWG and optical fiber) and is transmitted to a receiving end after passing through the second AWG which is de-multiplexing WDM signal into a group of n numbers at central office. Through this method, an error-free transmission of a signal can be obtained without being influenced substantially due to a change of ambient temperature. Here, each laser for subscriber is simply an FP-LD so that all subscribers may use a same-type laser regardless of injected wavelengths. That is, it is possible to embody an apparatus for subscribers independent of wavelengths.

Figure 12:
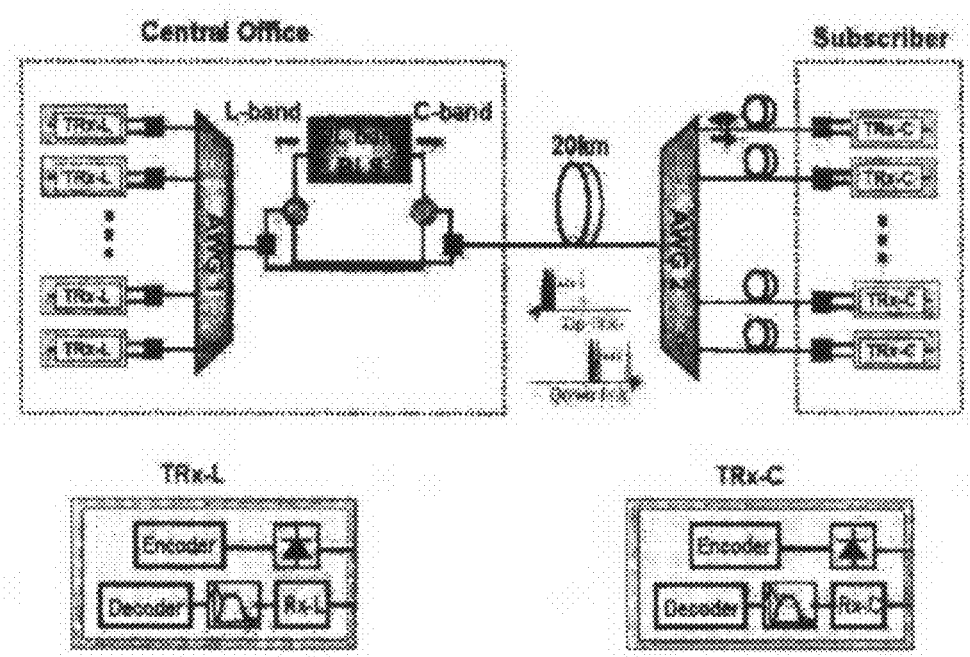
FIG. 12 illustrates a structural view of bi-directional WDM-PON based on FIG. 6.

As described above, the present invention describes an up-steam case where a subscriber transmits data to the central office. However, the method suggested in the present invention possibly applies to a down-stream case where the central office transmits data to a subscriber. In this case, both BLS and FP-LDs are positioned at the central office. An experimental structural view for applying to a bi-directional communications between a central office and subscribers is illustrated in FIG. 12. In FIG. 12, BLSs exist at the central office side, and transmitter and receiver are constructed as one combined unit where input and output signals are transmitted with being divided through WDM filter.

A light source like a wavelength locked FP-LD by injecting BLS using mutual injection of FP-LDs in accordance with a preferable embodiment of the present invention may be applied to a general-purpose light source for an optical communications where 1/f noise exists at a low frequency region. That is, 1/f noise still exists at a low frequency region for a wavelength locked FP-LD by injecting a light emitting diode (LED), an amplified spontaneous emission (ASE) diode, and super luminescent diode and thus it is possible to enhance performance of a modulated signal by applying a modulation method suggested in the present invention for reducing influence due to the 1/f noise.

INDUSTRIAL APPLICABILITY

According to the present invention, characteristics of wavelength locked lasers may vary depending on the temperature change of the lasers when BLS which is filtered based on a specific wavelength is injected into a laser for subscriber.

According to the present invention, an error-free transmission is possible, although a power penalty of approximately 2.5 dB occurs when measuring BER for analyzing transmitted signals at best and worst cases in performance of wavelength locked FP-LD3. That is, any wavelength locked FP-LD embodied by modulating a signal into a modulation format having an electrical spectrum in an area capable of avoiding noise of an injected BLS using mutual injection of FP-LDs is adapted for being used as a light source for subscriber regardless of a change of ambient temperature.

What is claimed is:

1. A light modulation method in an optical telecommunications system using a light source having a noise in a low frequency region comprising:
   modulating data into a wavelength locked light generated by the light source having an injected broadband light source noise in the low frequency region at a transmitter side into a modulation format having no an electrical spectrum component in the low frequency region of the injected broadband light source noise; and
   removing the injected broadband light source noise without influencing the data at a receiving side.

2. The light modulation of claim 1, wherein the light source having noise in the low frequency region is a wavelength locked Fabry-Perot (FP-LD) by a broadband light source (BLS) injected from outside.

3. The light modulation method of claim 2, wherein the wavelength locked FP-LD has an anti-reflection coating.

4. The light modulation method of claim 2, wherein the BLS injected from outside is a BLS using mutual injection of FP-LDs.

5. The light modulation method of claim 4, wherein the BLS using mutual injection of FP-LDs uses FP-LDs each having an anti-reflection coating.

6. The light modulation method of claim 4, wherein the BLS using mutual injection of FP-LDs improves a bandwidth by using a wideband FP-LD in which a gain band is wide.

7. The light modulation method of claim 4, wherein the light modulation method utilizes a modulation format which does not have an electrical component in a low frequency region such as bi-polar, RZ (RZ-AMI), Manchester, differential Manchester, B8ZS, HDB3 and pseudoternary, etc., when modulating signal at the transmitter side.

8. The light modulation method of claim 2, wherein the BLS injected from outside is one selected from a group of a light emitting diode (LED), an amplified spontaneous emission diode, and super luminescent diode.

9. The light modulation method of claim 1, wherein the light modulation method removes the noise without influencing the data at the receiving side by using a band pass filter (BPF).

10. An optical network comprising:
a broadband light source (BLS) being constructed by mutual injection between two Fabry-Perot laser diodes (FP-LDs) and an optical fiber being used for optical transmission;
first arrayed waveguide (AWG) for filtering light from a plurality of oscillation modes of the BLS into a group of n numbers;
n FP-LDs outputting wavelength locked light through the first AWG having an injected broadband light source noise in a low frequency region;
an encoder being provided at a transmitting end of a subscriber connected to at least one of the n-FP-LDs to encode data into the wavelength locked light, wherein the data do not have an electrical spectrum component in the frequency region of the injected broadband light source noise;
a circulator outputting light which is inputted through the first AWG and optical fiber;
second AWG de-multiplexing wavelength division multiplexing (WDM) signals from the first AWG into a group of n numbers; and
a decoder being provided at a receiving end which includes a receiver (RX) receiving the output from the second AWG.

11. The optical network of claim 10, wherein the optical network further comprises an EDFA being connected between the BLS and the circulator so than enough transmission power is provided.

12. The optical network of claim 10, wherein the optical network further comprises a polarization controller (PC) being connected between the BLS and the circulator so as to adjust a polarization of the BLS with a polarization of an FP-LD outputting wavelength locked light.

13. The optical network of claim 10, wherein the n FP-LDs have an antireflection coating, respectively.

14. The optical network of claim 10, wherein temperatures of n FP-LDs are controlled by a heater and a thermo electric cooler (TEC).

15. The optical network of claim 10, wherein the n FP-LDs are modulated to have a wavelength locked FP-LD characteristic by the BLS injected from outside.

16. The optical network of claim 10, wherein the encoder at the transmitting end and the decoder at the receiving end utilize a modulation format which does not have the electrical spectrum component in the low frequency region, wherein the modulation format is bi-polar, RZ (RZ-AMI), Manchester, differential Manchester, B8ZS, HDB3, or pseudoternary.

17. The optical network of claim 10, wherein the optical network further comprises a band pass filter (BPF) for cutting off the injected broadband light source noise in the low frequency region at the receiving end which includes receiver (RX) receiving the output from the second AWG.

18. The optical network of claim 10, wherein the optical network is used as an optical transmission apparatus for bi-directional telecommunications.

19. The optical network of claim 10, wherein light having different wavelength bands of the BLS is injected into a central office and a subscriber end, respectively.

20. The optical network of claim 10, wherein each of the n FP-LDs outputting wavelength locked light through the first AWG, an encoder comprising the transmitting end; and a band pass filter (BPF), a decoder comprising the receiving end are combined into one unit.

21. The optical network of claim 20, wherein inputs to the receiving end and outputs from the transmitting end are transmitted after being divided through a WDM filter.

22. The optical network of claim 10, wherein a band pass filter (BPF), a decoder being provided at the receiving end which includes receiver (RX) receiving the output from the second AWG comprising the receiving end; and each of the n FP-LDs outputting wavelength locked light, an encoder comprising the transmitting end are combined into one unit.

* * * * *